United States Patent [19]
Temel

[11] 3,842,803
[45] Oct. 22, 1974

[54] PET COMMODE

[76] Inventor: Franklin Temel, 1050 N.E. 91st Ter., Miami Shores, Fla. 33138

[22] Filed: July 3, 1973

[21] Appl. No.: 376,224

[52] U.S. Cl. .............................................. 119/1
[51] Int. Cl. ........................................ A01k 29/00
[58] Field of Search ........................................ 119/1

[56] References Cited
UNITED STATES PATENTS
| | | | |
|---|---|---|---|
| 3,656,457 | 4/1972 | Houston | 119/1 |
| 3,793,988 | 2/1974 | Traeger | 119/1 |

*Primary Examiner*—Russell R. Kinsey
*Assistant Examiner*—J. N. Eskovitz
*Attorney, Agent, or Firm*—Spencer & Kaye

[57] ABSTRACT

A pet commode composed of a housing having upstanding side walls and a recessed bottom to which a drain passage is connected, a floor disposed in the housing for supporting a pet and for receiving its bodily waste products, the floor being mounted to pivot about a substantially horizontal axis to permit waste products deposited on the floor to fall to the housing bottom, at least one water spray pipe located in the housing below the floor and arranged to direct water sprays upwardly against the floor while it is undergoing pivoting motion subsequent to the deposit of waste products thereon, and control devices for automatically pivoting the floor and initiating the water spray after a pet has left the commode.

17 Claims, 8 Drawing Figures

3,842,803

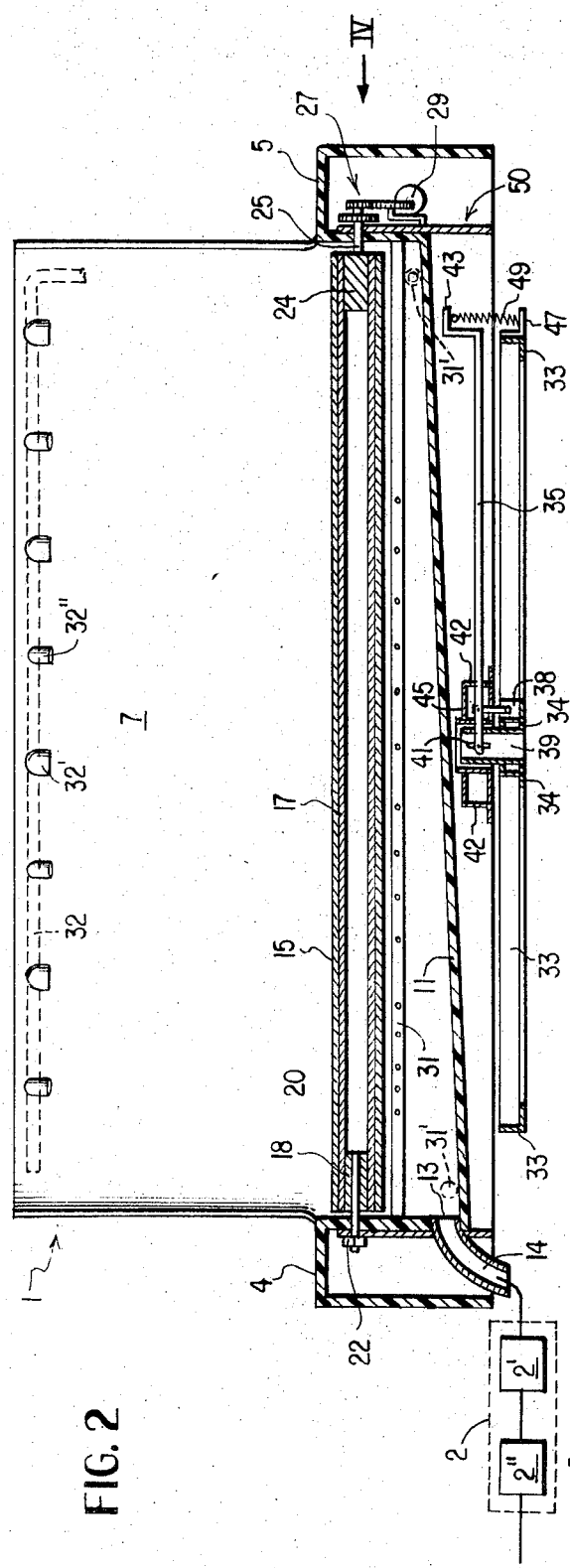
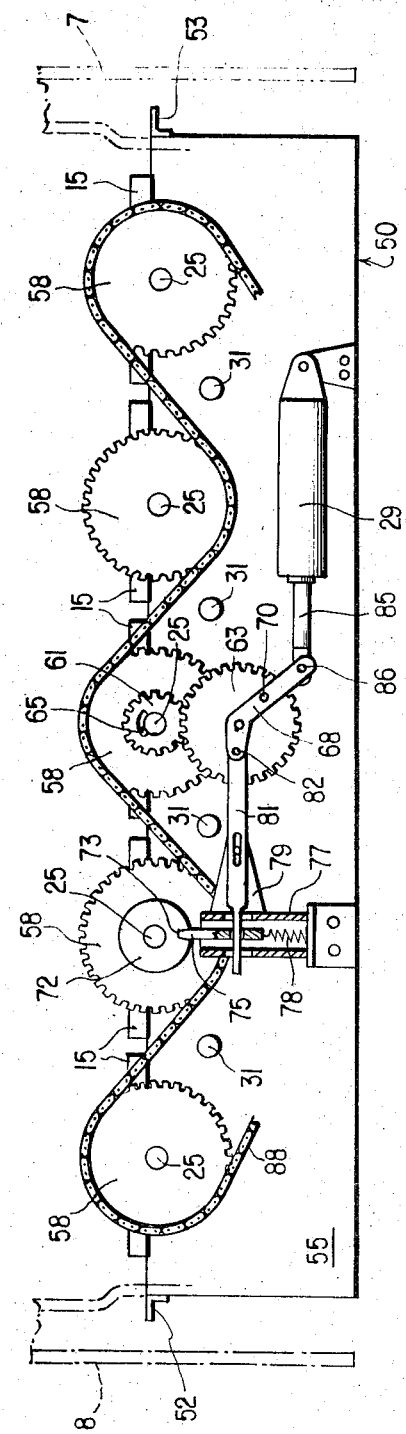
FIG. 2
FIG. 4

PET COMMODE

BACKGROUND OF THE INVENTION

The present invention relates to pet commodes, particularly of the type which is connectable to a sewage drain and which operates automatically.

One of the complicating factors of modern high density urban life is the difficulty which it creates for pet owners, particularly as concerns their pets' daily need to eliminate bodily wastes.

This problem is particularly acute in the case of dogs.

In particular in the case of seeing eye dogs great difficulties are encountered in providing for elimination by the animal. Quite often the blind owner must either permit the animal to relieve himself indoors or must incur the risks of walking the animal outdoors.

Even when a dog owner can walk his pet outdoors several times a day, no fully satisfactory location can be found for the elimination of fecal wastes. Elimination on the sidewalk, in the street curb, or on lawns raises obvious objections as does elimination in vacant lots, where children often play.

This problem is becoming increasingly difficult for dog owners as urban density increases and as more and more communities pass ordinances limiting the places where pets can defecate.

When the pet cannot be taken outside daily, for various reasons, the problem becomes even more acute. Litter boxes, newspaper, or other receptacles must then be provided for the elimination of waste products and require a periodic cleaning out, which is odious and time consuming and which inhibits the owner from leaving his home for long periods of time. In addition, such receptacles are a source of unpleasant odors and can therefore be satisfactorily placed only in a few locations around a house or apartment.

Among previous proposals addressed to this problem are various pet toilets, some of which are to be attached atop a toilet bowl intended for human use. These devices have various drawbacks. In particular, those which are to be attached atop a toilet bowl can be reached by the pet only with difficulty and require that the pet accurately position itself in order for the waste products to fall into the underlying toilet bowl. In addition, such a device, particularly if it provides for automatic toilet flushing, can be removed from the toilet only with difficulty. Therefore, a toilet equipped with such a device is, for all intents and purposes, made unavailable to human users.

Other units which have been previously proposed, whether they are to be cleaned automatically or under manual control, can often not be completely cleaned and thus leave waste residues which are unsightly and odorous.

SUMMARY OF THE INVENTION

It is a primary object of the present invention to eliminate these difficulties.

Another object of the invention is to eliminate the drawbacks associated with previously proposed pet toilets, relief stations, etc.

Yet another object of the invention is to provide for the completely automatic processing of the bodily waste products of pets without rendering an existing toilet unavailable for human use.

A further object of the invention is to provide an automatic animal waste receiving device which can be located at floor level so that its waste receiving surface is readily accessible to an animal. This enables the animal to be easily trained to use the device, with no more difficulty than is required for papertraining.

These and other objects according to the invention are achieved by the provision of a novel pet commode which includes a housing having opposed front and rear walls, opposed side walls extending to a height greater than that of the front and rear walls, and a bottom recessed below the upper extremities of the side walls and provided with an outlet passage. The commode according to the invention further includes a floor located in the housing for supporting a pet and receiving its bodily waste products, the floor being below the upper extremities of the front and rear walls and being mounted for pivotal movement about a substantially horizontal axis for permitting waste products deposited thereon to fall onto the housing bottom. A water spray device is also provided and is located in the housing below the floor for directing water sprays against the floor, the floor surface receiving waste products being struck by such sprays when the floor undergoes its pivotal movement. The spray device is associated with a controllable water delivery arrangement and the floor is associated with a controllable drive unit for imparting the desired pivotal movement thereto. A control unit is connected to the water delivery device and the drive unit and is responsive to the departure of a pet from the floor to cause the water delivery element to deliver water under pressure to the spray device and to cause the drive unit to impart the desired pivotal movement to the floor.

The floor is preferably constituted by a plurality of parallel slats each arranged to pivot about a longitudinally extending axis. The floor is preferably arranged to pivot through an angle of 180° or less under control of the drive unit and to pivot back to its original position at the end of a predetermined period of time. In preferred embodiments of the invention, the drive unit is in the form of a hydraulically actuated piston which is operated by water supplied by the delivery device, while the control unit is preferably constituted by an electric circuit having push button switches which are operated by the weight of an animal on the floor.

In preferred embodiments of the invention, the spray device is constituted by one or several spray pipes which extend parallel to the floor slats and which are each located directly below the narrow space separating two adjacent slats. Each spray pipe is provided with spray outlets disposed for causing water to be sprayed generally upwardly, but at an angle to the vertical to prevent water from spraying upwardly through the space between adjacent slats and thus striking surfaces outside of the housing.

The spray device further includes a spray pipe extending along the upper edge of each side wall and having a plurality of nozzles or outlet tubes extending through openings provided in the associated side wall. Some of these tubes supply a flushing stream to the side wall to wash away urine. The remaining tubes direct water streams onto the floor.

BRIEF DESCRIPTION OF THE DRAWINGS

FIG. 2 is a cross-sectional elevational view of one embodiment of a pet commode according to the invention, including the housing of FIG. 1.

FIG. 4 is a front elevational view, in the direction of the arrow IV of FIG. 2, of the mechanical components of the commode of FIG. 2, with the housing removed.

DESCRIPTION OF THE PREFERRED EMBODIMENTS

Figure 1:
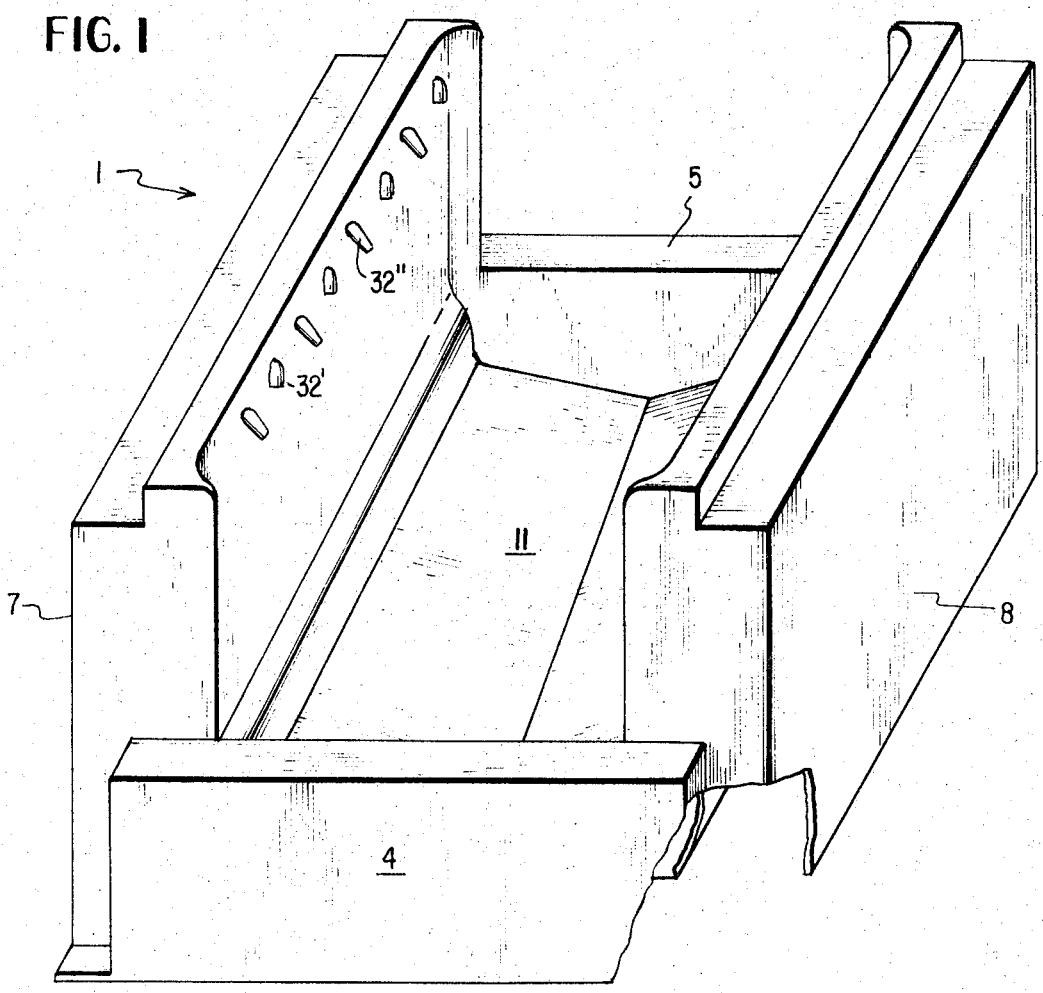
FIG. 1 is a perspective view of one preferred embodiment of the housing of a pet commode according to the invention.

FIG. 1 illustrates the general configuration of one embodiment of the housing of a pet commode according to the invention capable of being located directly on the floor of a dwelling. The housing 1, which can be a one-piece unit of a suitable material such as Fiberglas, porcelain, or a porcelain-coated body, any one of several types of plastic, or even stainless steel, is provided with front and rear walls 4 and 5 and upwardly extending side walls 7 and 8. The side walls 7 and 8 extend to a greater height than do the front and rear walls 4 and 5 and aid in preventing pet urine or flushing sprays from being sprayed outside of the housing.

The housing 1 further includes a bottom surface 11 which slopes downwardly from the side walls 7 and 8 toward the center of the bottom and which also slopes downwardly from the rear wall 5 to the front wall 4. Near the junction between the bottom surface 11 and the front wall 4 there is provided an opening (13 in FIG. 2) for the attachment of a suitable conduit for carrying water and waste products out of the housing and into a suitable sewage receptacle, which can be the sewage line provided in a dwelling, or a self-contained sewage treatment unit. For example, such a unit could be one of the waste disposal units manufactured by the firm Bio-Jester of Southern California, Tarzana, Calif. This unit normally includes a motor driven macerator for suitably preprocessing solid waste. Such unit produces essentially pure water at its water outlet and this water could be recycled for use in the commode. Units of this type also produce a solid, odorless "cake" of treated solid waste which must be periodically removed.

The floor and spray pipes for the pet commode according to the invention are disposed within the housing above bottom surface 11, with the upper surface of the floor being located below the upper extremities of front and rear walls 4 and 5. Conduit 14 may be connected to the inlet of a motor-driven macerator whose output can be connected to a sewage treatment unit of the type described above. Macerators are well-known and commercially available and have the characteristic that they prevent the flow of water when they are stopped. When such a device is provided, it can be stopped before termination of the various sprays, so as to enable a pool of water to collect on surface 11. Such a pool will facilitate flushing away of waste products at the time the system is next used.

As indicated by the broken-away portion of FIG. 1, housing 1 is preferably a thin-walled body which is formed in a manner such that walls 4, 5, 7 and 8 are double-walled elements enclosing a hollow space. This space surrounds the bottom region of the housing and can be employed to house the mechanical, electrical, chemical and hydraulic components of the commode.

FIG. 2 illustrates, in a cross-sectional view, one preferred embodiment of a completed pet commode according to the invention, with the various operating components mounted in the housing 1 of FIG. 1.

These components include a floor constituted by a plurality of adjacent slats 15, only one of which is visible. Each slat 15 is rigidly connected to a tube 17 of rectangular, and preferably square, cross section. At one end of the tube 17 there is provided a bushing 18 which is rigidly connected to the tube. The bushing 18 in turn supports a shaft 20 which is rotatable relative thereto. The shaft 20 passes through a suitable opening provided in end wall 4 and an aligned opening in a frame member 50, to be described below, and is held in place by any suitable element 22.

At the other end of tube 17 there is provided a shaft 25 having a portion 24 of rectangular cross section which is immovably joined to tube 17. The remaining portion of the shaft is of circular cross section and passes through a suitable opening in end wall 5 and an aligned opening in frame member 50. The shaft 25 is operatively associated with a gear assembly 27, the gears on that assembly being driven by a piston 29. The structure and operation of the gear assembly 27 and the piston 29 will be described in greater detail below. In general, they operate to rotate each slat 15 through an angle of 180° or less about the pivot axis defined by shafts 20 and 24.

Disposed below the slats 15 are a plurality of spray pipes 31 mounted between end walls 4 and 5. Each spray pipe is provided with a plurality of longitudinal arrays of water spray openings. All of these openings are preferably formed to produce sprays which are inclined to the vertical so as to prevent water from spraying upwardly through the spaces between adjacent slats and outside of the housing. Each pipe 31 is supported in any suitable manner between end walls 4 and 5 and passes through a suitable opening in end wall 5 to be connected to a water supply conduit.

As an alternative to the arrangement of pipes 31 shown in FIG. 2, the water sprays could be provided by several pipes 31', as shown in broken lines, located at or near the bottom surface 11, and each extending between side walls 7 and 8. The pipe 31' near end wall 4 could be divided into two parts, each connected to a source of water at a respective side wall, to leave clear the region in front of opening 13. The pipe 31' near end wall 5 is preferably provided with a number of spray openings which are oriented to direct water sprays against the floor slats and along surface 11 to assist the removal of waste matter.

Additional water sprays are provided at the upper edges of side walls 7 and 8 by a spray pipe 32 disposed within the hollow space at the top of each side wall. Spray pipes 32 are connected to the same supply conduit as pipes 31. Each pipe 32 is provided with two types of outlet tubes, or nozzles 32' and 32''. Tubes 32' are formed to produce streams of water which flow down walls 7 and 8 to wash away urine. Thus their form and number are made sufficient to produce a sheet of water entirely covering the wall surfaces. Nozzles 32' produce jets or sprays of water which strike floor slats 15 to aid the cleansing operation.

Bottom wall 11 of housing 1 is provided, at its lowest end, with an opening 13 in which is connected a drain conduit 14. Conduit 14 can be of any metal or other material suitable for plumbing applications.

In the arrangement illustrated, conduit 14 is connected to the inlet of a motor-driven macerator 2' of a compact sewage treatment unit 2 of the type described above. The outlet of macerator 2' is connected to the inlet of the waste dewatering and chemical processing portion 2'' of unit 2. The outlet of portion 2'' produces a flow of essentially pure water which could be delivered to the water inlet for the commode for reuse. Specifically the treated water could simply be fed to the input pump 103, shown in FIG. 5, together with any necessary make-up water.

Below bottom wall 11 there is provided a support base supporting frame 50 and housing 1 and carrying a sensor assembly for responding to the entry of a pet onto the floor defined by slats 15 and the subsequent departure of the pet therefrom.

Figure 3:
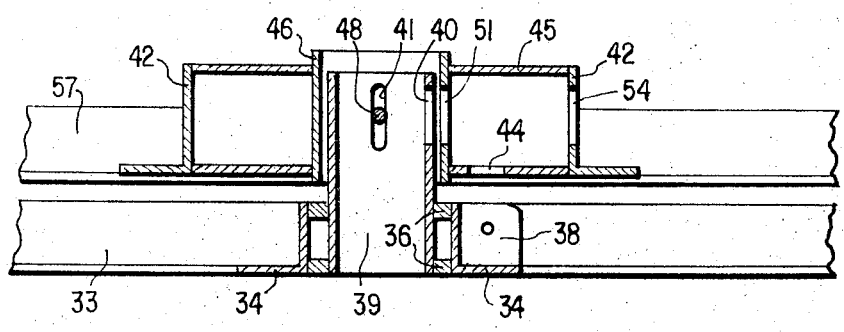
FIG. 3 is a cross-sectional, elevational, detail view of part of the arrangement of FIG. 4, with certain elements removed to facilitate understanding.

Referring to FIGS. 2 and 3 together, the support base, which supports the entire device on a support surface, is composed generally of four angle irons 33 joined at their ends to form a rectangular frame. Two further angle irons 34 have their ends connected to, and extend between, the two opposed angles 33 which lie parallel to housing side walls 7 and 8. Between angle irons 34, and approximately at their midpoint, there are attached two horizontally disposed, vertically spaced support plates 36, shown in FIG. 3. A vertically oriented cylindrical tube 39 is fixed in openings formed in plates 36. A vertically oriented support plate 38 is fixed to one of the angle irons 34, also approximately at its midpoint.

The frame 50 is in the form of a generally box-shaped framework of angle irons such as 57 (and 52, 53 and 56 shown in FIG. 4) dimensioned to directly support housing 1. Frame 50 is thus located within the hollow space defined by double-walled elements 4, 5, 7 and 8 with the inner walls of these double-walled elements resting directly against the frame. These inner walls can be formed to be inclined slightly to the vertical in a downward direction toward one another to allow better support by the frame.

Housing 1 can simply rest in frame 50 or can be rigidly fastened thereto, as by bolts, rivets, adhesive, or the like. Such rigid fastening facilitates accurate alignment of the bores formed in both the housing and the frame for the passage of shafts 20 and 25.

Frame 50 includes a further pair of angle irons 42 which extend, and are connected, between the two angle irons 56 and 57, shown in FIG. 4, irons 56 and 57 being disposed along the bottom of the frame and extending parallel to housing side walls 7 and 8. A hollow, open-ended tube 45 is connected between irons 42, at approximately their midpoint. Tube 45 can be of square or rectangular cross section. A vertically oriented, cylindrical open-ended tube 46 is housed in circular openings formed in tube 45 and is rigidly fixed thereto.

Tube 46 is given an inner diameter slightly larger than the outer diameter of tube 39 and, in the assembled device, tube 39 nests in tube 46 so that the latter, and the remainder of frame 50, can undergo a limited amount of vertical movement relative to the support base.

The support base supports a lever 35 through the intermediary of a pivotal fulcrum lever 37. Levers 35 and 37 are omitted from FIG. 3 to facilitate an understanding of the structure shown in that figure. The lower end of lever 37 is pivotally supported by a pivot pin mounted in the pivot opening in plate 38, the opening being visible in FIG. 3. The upper end of lever 37 is pivotally connected to an intermediate point along the length of lever 35 and lever 35 passes through tube 45 and through vertical slots 40, 51 and 54 in members 39, 46 and 42, respectively.

The end of lever 35 located within nested tubes 39 and 46 is pivotally connected to tube 46 by means of a suitable pivot pin engaging in diametrically opposed bearing openings 48 in tube 46. The pivot pin passes through diametrically opposed vertical slots 41 in tube 39. The presence of these slots permits this end of lever 35, as well as tube 46 and the remainder of frame 50, to move a limited distance in the vertical direction relative to tube 39 and the remainder of the support base.

The other end of lever 35 carries a flange 43. The support base also carries a flange 47 and a tension spring 49 is mounted between flanges 43 and 47 to urge flange 43 downwardly.

Tension spring 49 is adjustably connected to flange 43 to produce a force sufficient to maintain lever 35 in a position such that the bottom of tube 46 is normally spaced a selected distance above the upper surface of the top plate 36.

However, when an animal comes to rest upon slats 15, its weight moves housing 1 and frame 50 downwardly, pivoting lever 35 counterclockwise against the return force of spring 49. The resulting upward movement of flange 43 can be utilized to operate a suitably located switch.

When the animal leaves the floor defined by slats 15, the housing 1 and frame 50 return to their original positions, and lever 35 is urged back into its original position, by tension spring 49, during which movement flange 43 can engage a second switch providing an indication that the animal has left the enclosure. Thus, lever 35 and spring 49 essentially constitute the sensor assembly.

Of course, the push-button switches could also be disposed to be operated directly by the lever 35 along any portion of its length. However, the flange 43 will undergo a greater amount of movement than any point along the lever so that this is the preferred element for operating the push-button switches. In addition, the switches need not be of the push-button type and could, in fact, be of any type capable of being operated by a moving member.

Frame 50 also supports the operating components of the device.

The floor slats can have forms other than that shown in FIG. 2. For example, the slats could have curved upper surfaces, which could be upwardly convexly curved. The slats could also have a triangular, or other prismatic, cross section, or could be oval, elliptical, or circular in cross section. Many other forms are also possible.

One embodiment for the mechanism for rotating the floor slats 15 is shown in FIG. 4, which is an elevational view taken in the direction of the arrow IV of FIG. 2, with the housing 1 removed. However, the location of the structure relative to the housing is indicated by a broken line representation of a portion of the side walls 7 and 8. The frame 50 includes two side angle irons 52 and 53 which, in the assembled state, will be disposed within the space defined by the double walls of side walls 8 and 7, respectively. Angle irons 52 and 53 are dimensioned to extend along the entire length of walls 7 and 8.

Connected between angle irons 52 and 53 is a vertically oriented plate 55 rigidly connected to irons 52 and 53 and provided with openings for the passage of shafts 25. Plate 55 will be installed in the space between the double walls defined by end wall 5. A part of each shaft 25 which extends past plate 55 is fixed to a respective gear wheel, or toothed wheel, 58. Thus, each wheel 58 is associated with a respective floor slat 15.

The shaft 25 at the center of the arrangement also carries a gear 61 arranged to engage, and rotate, with a gear 63 rotatably mounted on plate 55. The diameter of gear 63 is twice that of gear 61 to provide a 2:1 gear ratio.

Gear 61 is not rigidly connected to its associated shaft 25, but is rather operatively associated therewith via a key 65 mounted on shaft 25 and a cooperating cutout formed in gear 61. This cutout is formed to permit gear 61 to rotate through an angle of, for example, 30° relative to its associated shaft 25.

Pivotally mounted on the pivot bearing of gear 63 is a two-armed lever 68 drivingly connected to gear 63 by a connecting pin 70.

A different one of the shafts 25, in the embodiment illustrated this being the shaft to the left of the central shaft, carries a locking cam wheel 72 which is fixedly attached to its associated shaft 25. Cam wheel 72 is formed with a locking recess 73 arranged to cooperate with a locking pin 75.

Pin 75 is disposed in a housing 77 fastened to plate 55, for example by bolts. Pin 75 is mounted to be guided for vertical movement in housing 77 and at the lower end of the interior of housing 77 there is provided a compression spring 78 associated with pin 75 in such a manner as to normally urge the pin into locking recess 73, thereby blocking any rotation of the associated shaft 25. Housing 77 is also provided with an integrally formed supporting ear 79 carrying a pin which in turn supports a lever member 81.

Lever member 81 is provided with a slot through which the pin on ear 79 passes and which permits the lever 81 to undergo a certain degree of longitudinal movement relative to housing 77. One end of lever 81 extends through diametrically opposed slots in housing 77, as well as through a mating passage formed in pin 75 to permit lever 81 to slide longitudinally relative to pin 75 but to drive the pin in a vertical direction when the lever pivots about the pivot point provided on ear 79.

The other end of lever 81 is pivotally connected to end 82 of lever 68. With this arrangement, clockwise rotation of gear 63 will pivot lever 81 to retract pin 75 from recess 73.

The pin 75 could, in alternative embodiments of the invention, be actuated in different ways. For example, this pin could be made of a suitable material and associated with a solenoid winding connected to the system control circuit for retracting the pin upon departure of an animal from the floor.

Also fastened to plate 55 is a support bracket pivotally supporting one end of a hydraulic cylinder 29. The piston arm 85 of cylinder 29 pivotally connected at its free end to the other end 86 of lever 68. Plate 55 is also provided with openings for the passage of the inlet ends of spray pipes 31 and possibly connections to pipes 32.

The gear wheels 58 are provided with a motion transmitting connection in the form of a chain 88. Chain 88 is connected between the gear wheels 58 in such a manner as to cause the direction of rotation of the gear wheels to be reversed from one gear wheel to the next. Chain 88 is preferably a continuous chain, the lower, or return, reach of this chain being indicated by arrows. Chain 88 could also be mounted to rotate all gear wheels in the same direction.

The chain 88 could be eliminated and the gear wheels 58 dimensioned to directly engage one another. However, the use of a chain drive offers the advantage of reducing the manufacturing tolerances imposed upon the gear wheels 58 and of permitting smaller, and hence lighter, gear wheels to be employed.

In operation, water is supplied to the interior of cylinder 29 by a system to be described below. The pressure of the fluid drives piston arm 85 to the left, causing gear 63 to rotate clockwise. This clockwise rotation results in some downward movement of cylinder 29, which is permitted by the pivotal mounting of the cylinder to plate 55.

The clockwise rotation of gear 63 produces a corresponding counterclockwise rotation of gear 61. However, because of the key and cutout connection of gear 61 to shaft 25, the initial portion of the rotation of gears 63 and 61 does not impart any rotational movement to the central gear 58. During this initial rotation, lever 81 is pivoted counterclockwise, while being permitted to move longitudinally as the result of its connection to ear 79, and thus moves pin 75 downwardly, withdrawing the upper end of that pin from recess 73. Therefore, cam wheel 72 and its associated gear wheel 58 are made free to rotate.

Continued rotation of gears 63 and 61 initiates rotation of the gear wheel 58 associated with gear 51 and, through chain 88, the remaining gear wheels 58. As a result of the 2:1 ratio between gears 63 and 61, a 90° rotation of gear 63 will produce a 180° rotation of gear wheels 58, causing the slats 15 to be completely inverted so that waste products deposited on slats 15 can fall onto the bottom surface 11 of housing 1.

At the end of a preset period, piston arm 85 will be retracted into cylinder 29, rotating the gear wheels 58 and slats 15 back to their original position. Correspondingly, lever 81 pivots back to its original position, enabling pin 75 to move upwardly into engagement with recess 73 under the influence of compression spring 78.

During at least part of the time that fluid under pressure is being supplied to cylinder 29, it will also be supplied to spray pipes 31. Thus, while the slats 15 are pivoting, they are being continuously sprayed so as to wash animal waste products off of that surface of the slats which is normally directed upwardly. This washing spray then falls onto bottom surface 11 of housing 1 and serves to flush the waste products out of the housing via conduit 14.

In preferred embodiments of the invention, all of the necessary cleansing and flushing operations can be controlled simply by controlling the supply of liquid to piston 29 and pipes 31.

Figure 5:
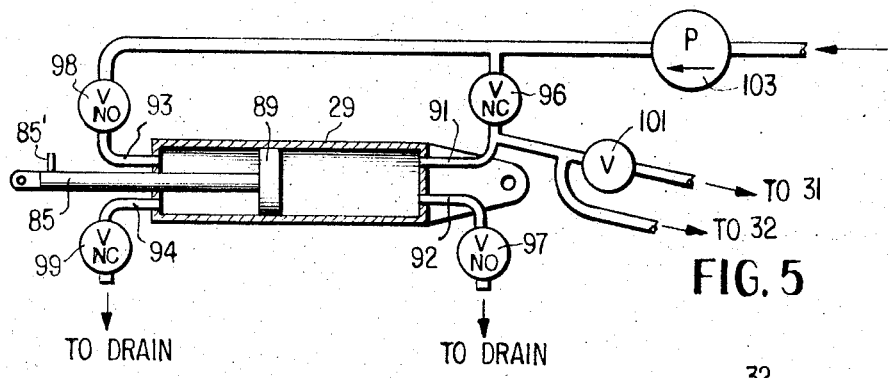
FIG. 5 is a partly cross-sectional, partly schematic view of the drive cylinder and control valves of preferred embodiments of the invention.

One arrangement for supplying water to the commode unit according to the invention is shown in FIG. 5. Within cylinder 29 is a drive piston 89 connected to arm 85. Piston 89 divides the interior of cylinder 29 into two chambers, as is common. Each end of chamber 29 is provided with two fluid passages to which are connected conduits 91, 92 and 93, 94, respectively. Each conduit is provided with a respective one of the solenoid controlled valves 96, 97, 98 and 99.

Each valve has the normal, i.e. deactivated, state indicated, that is valves 96 and 99 are normally closed and valves 97 and 98 are normally open.

Valves 96 and 98 are fluid inlet valves connected to a water supply conduit, while valves 97 and 99 are outlet valves connected to the system drain. All valves are normally arranged to operate in unison, i.e. to all be activated or deactivated at the same time.

Thus, with all valves deactivated, water under pressure will be supplied to the left-hand cylinder chamber while the right-hand cylinder chamber is connected to the system drain. This will urge piston 89 and arm 85 to the right, into their retracted position, and maintain them in that position.

Conversely, with all valves actuated, fluid under pressure will be supplied to the right-hand cylinder chamber while the left-hand chamber is connected to the drain, resulting in movement of piston 89 and arm 85 to the left and hence rotation of floor slats 15.

Supply conduit 91 feeding the right-hand cylinder chamber is also connected to deliver water under pressure to spray pipes 31 and 32. The conduit delivering water to pipes 31 may optionally be provided with a solenoid controlled valve 101 which is switchable between a first state in which it permits a limited flow of water to pipes 31 and a second state in which it permits a full flow of water thereto. The first state of valve 101 can also be one in which it totally blocks flow to pipes 31. Valve 101, when provided, is associated with a switch which causes the valve to be in its first state while piston 89 is being driven to the left and which causes the valve to switch to its second state when piston 89 reaches its extreme left-hand position. This causes the pipes to produce gentle streams of water while the slats 15 are rotating and more forceful streams, or jets, after the slats have been completely inverted. At the same time, when valve 101 is in its first state, the flow of water to pipes 31 is set so as to assure maintenance of sufficient pressure in the right-hand cylinder chamber to drive piston 89 completely to the left.

Pipes 32 are connected to receive a full flow as soon as valve 96 opens.

The operating state of valve 101 can be easily controlled by connecting its solenoid to a source of operating power via a microswitch and by providing a suitable abutment 85' on arm 85 or a suitable cam on gear wheel 63 or on one of gears 58 to activate the switch when the piston 89 has reached the left-hand end of its travel path.

It may also be desirable to optionally provide a pump 103 in the water supply conduit feeding valves 96 and 98, particularly if the unit is to be employed in an area where the water supply pressure is usually or occasionally low. Such pump might also be provided if it is desired to reduce the diameter of the cylinder 29.

Pump 103 can be connected to be driven by an electric motor via switches which initiate pump operation upon the actuation of valves 96–99 and which terminate pump operation when piston 89 reaches its retracted position. The switch for terminating operation could be a microswitch mounted to be operated at the appropriate time by the above-described abutment 85' on arm 85 or cam on gear wheel 63 or on one of gears 58. In the case of a cam on wheel 63, the microswitch for terminating pump operation would be offset by 90° from the switch for controlling valve 101, while the offset would be 180° of the cam is on one of gears 58.

Figure 6:
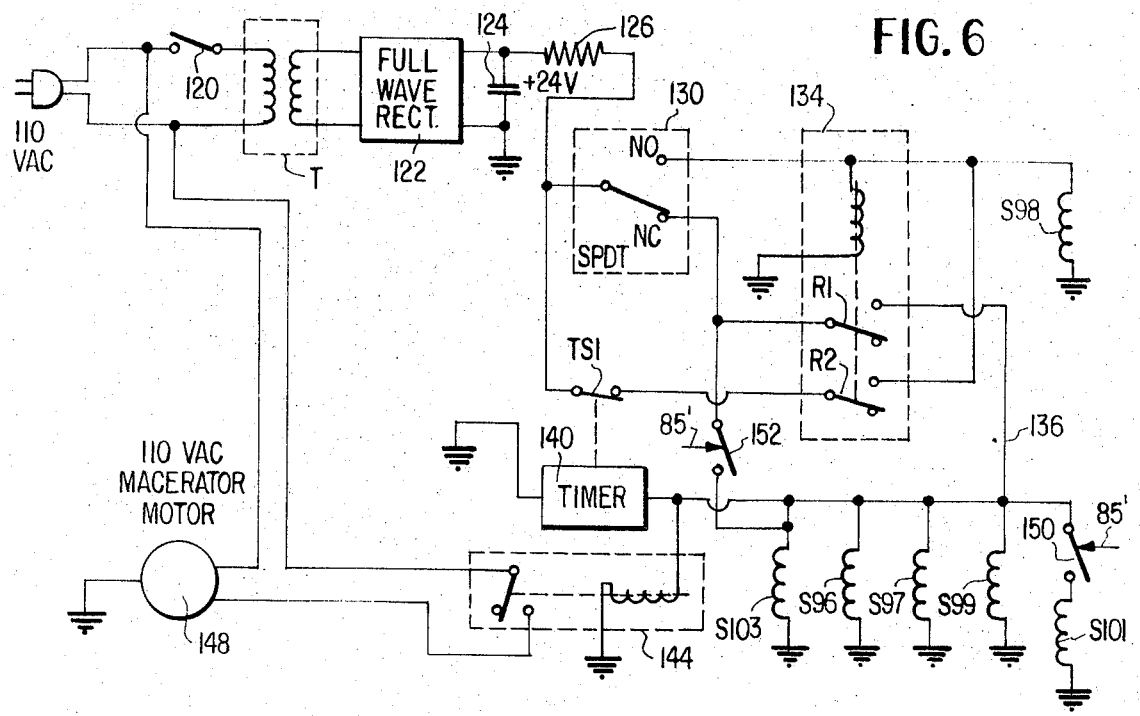
FIG. 6 is a schematic diagram of one embodiment of a control system of a commode according to the invention.

One embodiment of an electrical control circuit for the apparatus according to the present invention is shown in FIG. 6. This circuit is arranged to be connected to, and operated by, ordinary 110 volt a.c. house power. To this end, it is provided with a plug connected to an isolating transformer T via a main on-off switch 120. The secondary of transformer T is connected to the a.c. inputs of a full wave rectifier 122. The d.c. output of the rectifier, which might have a value of the order of 24 volts, is connected across a smoothing capacitor 124. The positive side of the rectifier output is connected, via a resistor 126, to the common terminal of a single pole, double throw, break before make switch 130 mounted to be operated by the movement of lever 35 or its associated flange 43 (FIG. 2).

The normally open (NO) contact of switch 130 is connected to the coil of a latching relay 134 while the normally closed (NC) contact of switch 130 is connected to the common terminal of a first switch R1 of relay 134.

The normally open contact of switch R1 is connected via line 136 to the operating coils S96, S97 and S99 of valves 96, 97 and 99, respectively (FIG. 5), and to the trigger, or time delay initiation, input of a timer 140. While timer 140 may be of a variety of types, it is preferably a solid state timer of the type which can effect operation of a switch at a predetermined time after application of power to its trigger input and which resets automatically when power is removed from its trigger input. One suitable timer of this type is the Agastat-3712 N11D timer manufactured by the Amerase Esna Corp. of Elizabeth, New Jersey.

Timer 140 is provided with a normally closed switch TS1 which opens after a preset time interval from the initial application of power via line 136.

Switch TS1 is connected in series between resistor 126 and the common terminal of a second switch R2 of relay 134. The normally open contact of switch R2 is connected to the coil of relay 134 to perform a latching function.

Line 136 is also connected to the coil of a holding relay 144 provided with a normally open switch connected between one side of the a.c. power line feeding transformer T and one input of a 110 volt a.c. macerator motor 144. The other power input of motor 144 is connected to the other side of the a.c. power line input. Motor 140 drives a suitable macerator device which is connected to receive, and process, the material flowing through conduit 14 shown in FIG. 2. Such macerator devices are well-known and any commercially available device of suitable capacity can be used.

The normally open contact of relay switch R2 is also coupled to coil S98 of valve 98, while line 36 is further connected to coil S101 of valve 101 via a normally open microswitch 150.

The normally closed contact of switch 130 is further connected to coil or motor winding S103 for controlling the operation of pump 103, this connection being via a normally closed microswitch 152. Element S103 is also connected to line 136.

Switches 150 and 152 are mounted in the apparatus to be operated by abutment 85' on arm 85 (FIG. 5), or by a cam on wheel 63 or on one of gears 58, as described above. Switch 150 is mounted to be closed just as arm 85 reaches the left-hand, or fully extended, end of its travel path and switch 152 is mounted to be opened when arm 85 reaches the right-hand, or retracted, end of its travel path.

When the apparatus is in its ready state, piston 89 is fully retracted and all switches are in the position shown, except that switch 120 is closed.

An animal stepping onto floor slats 15 of the unit causes the floor, and housing 1, to move downwardly a small amount, moving switch 130 into its active position, with its NO contact connected to rectifier 122 and its NC contact disconnected. As a result, operating power is supplied to the coil of relay 134 and switches R1 and R2 are actuated. Operating power is also at this time supplied to coil S98 so that valve 98 is closed. The closing of valve 98 has no effect, however, on cylinder 29.

Actuation of switch R1 connects line 136 to the NC contact of switch 130 but does not cause power to be applied to that line since the NC contact of switch 130 is open-circuited.

Actuation of switch R2 connects the rectifier output to the coil of relay 134, via normally closed switch TS1. Therefore, relay 134 is held in its actuated state.

When the animal subsequently leaves the floor of the unit, switch 130 is returned to its normal state, with its NC contact connected to rectifier 122.

Relay 134 remains actuated since its coil continues to receive current via switch R2. However, operating power is now supplied to line 136 and switch 152. The power on line 136 actuates coils S96, S97, S99 and S103, as well as the coil of relay 144, and triggers the operation of timer 140.

Actuation of coil S103 begins operation of pump 103. Actuation of coils S96, S97 and S99 opens valves 96 and 99 and closes valve 97, valve 98 having been previously closed. As a result, piston 89 is driven to the left. When the piston begins moving, abutment 85' moves out of operative contact with switch 152 and the switch therefore moves to its normally closed position to provide a second actuating power connection to coil S103.

Actuation of relay 144 begins operation of motor 148.

Piston 89 is then driven to the left and just as it reaches its fully extended position, abutment 85' closes switch 150, applying actuating power to coil S101 to open valve 101 and permit full water flow to pipes 31 and 32. Since it may be desirable to delay operation of motor 148 until this full flow begins, the coil of relay 144 could alternatively be connected in parallel with coil S101.

After piston 89 reaches its fully extended position, it remains there until the end of the timing period determined by the setting of timer 140. At the end of this timing period, timer 140 opens switch TS1. This removes actuating power from relay 134, resulting in the return of the relay switches R1 and R2 to their deactuated positions. Therefore, actuating power is removed from coils S96-S99, and S101 and from the coil of relay 144. This halts operation of motor 148 and closes valve 101. This also opens valves 97 and 98 and closes valves 96 and 99 so that piston 89 is driven back to the right toward its retracted position.

However, coil S103 continues to receive actuating power via switch 152, and thus pump 103 continues operating, until piston 89 reaches its fully retracted position, whereupon abutment 85' opens switch 152 and pump 103 stops.

The removal of actuating power from line 136 also causes timer 140 to reset and to reclose switch TS1.

The unit is now ready for re-use.

The circuit shown in FIG. 6 provides safety features to protect an amimal from injury if it should step back onto the unit after an operating cycle has begun. If this should occur, the weight of the animal on floor slats 15 or on the bottom 11 of housing 1 will operate switch 130 to connect its NO contact to the rectifier. As a result of the disconnection of the NC contact of switch 130, power will not be applied to line 136, or to coil S103, although relay 134 will be actuated directly via the NO contact of switch 130.

Removal of power from coil S103 will halt pump 103 and removal of power from line 136 will reset timer 140 and deactuate coils S96, S97, S99 and S101 and the coil of relay 144. Therefore valve 101 will close and motor 148 will stop.

Deactuation of coils S96, S97 and S99 will close valves 96 and 99 and open valve 97. However, coil S98 will at this time be, or remain, actuated, since it receives power via the NO contact of switch 130, whether or not switch TS1 is closed, i.e. regardless of whether the piston 89 was in the process of being extended or retracted. Therefore, valve 98 is held closed and since valve 96 is also closed, the piston 89 will stop until the animal again departs from the floor. The halting of the piston is aided by the stopping of pump 103.

When the animal does again depart, switch 130 will return to its normal state and the operating cycle will recommence and go through a full cycle since timer 140 has been reset.

The duration of the operating period provided by timer 140 can be selected to have any desired value and this value is determined on the basis of the time necessary to completely clean the floor slats 15, to flush the animal bodily waste products out of housing 1, and to enable all the waste products to be processed by the macerator operated by motor 148.

According to a modified form of construction of the drive system according to the invention, the hydraulic piston and control valves could be replaced by an electric motor having its output shaft operatively connected to the shaft of wheel 63 or the shaft 25 of the central gear wheel 58 (FIG. 4), for example by means of a worm gear drive. The drive motor could be controlled by a suitable timer and microswitches operatively associated with cams mounted on gear wheel 63 or one of gears 58. Such motor could be of the type capable of being driven in either direction, or could provide a unidirectional drive. In the latter case, it would be controlled to rotate the slats through an angle of 180° and the slats would remain in that orientation until the next cycle of operation, whereupon they would again rotate through an angle of 180°. In this manner, both sides of the slats would be employed and the useful life of the unit would therefore be increased. If the slats have a polygonal configuration, for example triangular, a number of cams, or microswitches, could be provided, and suitably located, to cause the motor to rotate the slats through a suitable fraction of one revolution during each operating cycle. For example, if the slats have a triangular configuration, with three support surfaces, each cycle of operation would involve rotation of the slats through an angle of 120°.

In any of these embodiments, the timer could easily be arranged to control the supply of water to the spray pipes and the operation of the macerator. It could equally well control the pump supplying water to the spray pipes, if such a pump is provided.

As a further safety feature, either the embodiment illustrated in the present drawings, or the above-described embodiment utilizing an electric motor in place of the drive cylinder, could be provided with a suitable slip clutch between the driving system and the gear wheels 58. The primary function of this slip clutch would be to assure that if an animal's leg should become wedged between adjacent slats, while the slots are rotating, rotation would halt without injuring the animal.

Figures 7, 8:
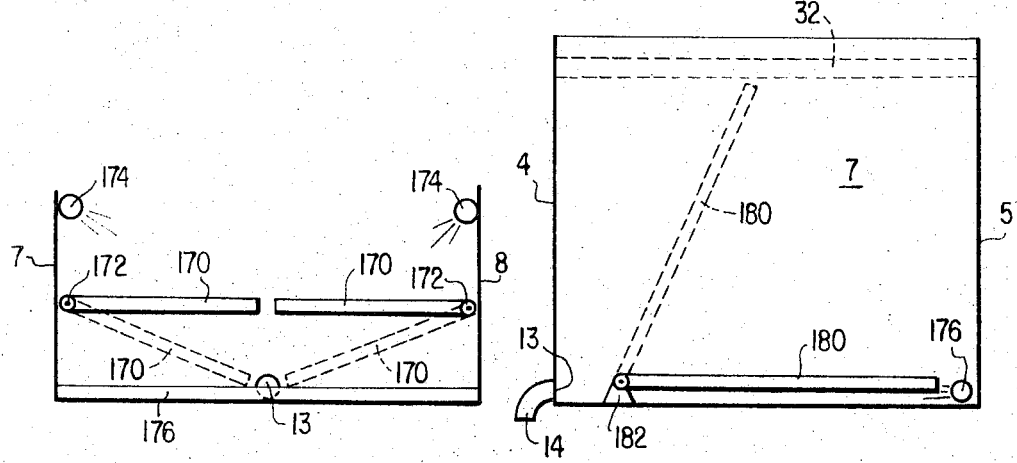
FIGS. 7 and 8 are simplified, elevational, pictorial views of two modified forms of construction according to the invention.

FIGS. 7 and 8 illustrate two alternative forms of construction for the floor structure of units according to the invention.

In the embodiment of FIG. 7, the floor is constituted by two plates 170 each pivotally supported by a respective pivot member 172 mounted at a respective side wall 7 or 8. Plates 170 are connected to a suitable drive arrangement adapted from that shown in FIGS. 4 and 5 to pivot between a ready position shown in full lines, and a cleaning position, shown in broken lines. When plates 170 are in the cleaning position, they are washed by sprays from pipes 174 which pipes are provided with suitable openings to produce essentially the illustrated spray pattern. A pipe 176 is provided adjacent end wall 5 (not visible) to produce a spray which washes the bottom surface of the housing.

In the embodiment shown in FIG. 8, which is a longitudinal view, the floor is composed of a single plate 180 pivotal between the ready position, shown in solid lines, and the cleaning position, shown in broken lines, about pivotal supports 182 disposed at end walls 7 and 8. Cleaning of the floor is achieved by sprays from pipes 32 identical with those in FIGS. 1 and 2 and mounted on side walls 7 and 8. The bottom surface of the housing can be cleaned by sprays from a pipe 176 identical with that of FIG. 7.

It might be mentioned that the floor structures shown in FIGS. 7 and 8 offer certain advantages but do not provide as satisfactory or convenient operation as the floor structure shown in FIGS. 2 and 4.

It will be understood that the above description of the present invention is susceptible to various modifications, changes and adaptations, and the same are intended to be comprehended within the meaning and range of equivalents of the appended claims.

I claim:

1. A pet commode comprising in combination:
   a. a housing having opposed front and rear walls, opposed side walls, and a bottom recessed below the upper extremities of said side walls and provided with an outlet passage;
   b. means located in said housing and defining a floor for supporting a pet and receiving its bodily waste products, said floor being mounted for pivotal movement about a substantially horizontal axis for permitting waste products deposited on said floor to fall onto said housing bottom surface;
   c. water spray means located in said housing for directing water sprays against said floor, whereby the surface of said floor which receives waste products is struck by such sprays when said floor undergoes such pivotal movement;
   d. controllable water delivery means connected to said spray means for delivering water thereto;
   e. controllable drive means connected to said floor for imparting such pivotal movement thereto; and
   f. control means connected to said water delivery means and to said drive means and responsive to the departure of a pet from said floor for causing said delivery means to deliver water under pressure to said spray means and for causing said drive means to impart such pivotal movement to said floor.

2. An arrangement as defined in claim 1 wherein said side walls extend to a greater height than do said front and rear walls.

3. An arrangement as defined in claim 1 wherein said means defining a floor comprise a plurality of slats disposed side by side, and a plurality of pivotal supports each associated with a respective slat for pivoting its associated slat about a substantially horizontal axis, the pivot axes of all of said slats being substantially parallel to one another.

4. An arrangement as defined in claim 3 wherein said controllable drive means are connected to said pivotal supports for simultaneously pivoting all of said slats and for pivoting adjacent slats in respectively opposite directions.

5. An arrangement as defined in claim 4 wherein said controllable drive means comprise a toothed wheel connected to each pivotal support and a drive chain operatively connected between all of said toothed wheels for providing a rotation transmitting connection between said wheels.

6. An arrangement as defined in claim 5 wherein said controllable drive means further comprise a hydraulic cylinder provided with a piston arm and arranged to drive said piston arm under the influence of pressure fluid in said cylinder, and means connecting the free end of said piston arm to one of said wheels.

7. An arrangement as defined in claim 6 further comprising interlocking means connected to said connecting means and operatively associated with said wheels for normally locking said wheels against rotation and for freeing said wheels for rotation upon the initiation of driving movement of said piston arm.

8. An arrangement as defined in claim 3 wherein said water spray means comprises a plurality of spray pipes extending parallel to the pivot axes of said slats, each said spray pipe being disposed directly below the line of separation between two adjacent slats.

9. An arrangement as defined in claim 8 wherein each of said spray pipes is provided with water spray openings oriented for spraying water upwardly against said slats only in directions inclined to the vertical.

10. An arrangement as defined in claim 1 wherein said water spray means comprises two spray pipes each disposed along, and in the vicinity of the upper end of, a respective side wall for producing a spray which washes said floor.

11. An arrangement as defined in claim 10 wherein said spray pipes also produce a spray which washes said side walls.

12. An arrangement as defined in claim 10 wherein said water spray means further comprises at least one spray pipe located below said floor and adjacent one of said front and rear walls for producing a spray which washes at least said housing bottom.

13. An arrangement as defined in claim 1 wherein said controllable water delivery means comprises at least one controllable valve connected to said spray means and connectable to a source of water under pressure.

14. An arrangement as defined in claim 13 wherein said housing is supported to move downwardly under the influence of the weight of an animal on said floor and said control means comprise at least one mechanically actuated switch operatively associated with said housing to perform a switching operation as a result of the downward movement of said housing upon the departure of an animal from that floor.

15. An arrangement as defined in claim 14 wherein said control means further comprise a preset timer for causing water to be delivered to said spray means and for causing said drive means to impart such pivotal movement to said floor for a predetermined period of time after departure of an animal from said floor.

16. An arrangement as defined in claim 1 further comprising a compact sewage treatment unit capable of converting sewage into essentially pure water and having a sewage inlet connected to said outlet passage in said housing, said housing and said unit forming a self-contained waste collecting and treatment system.

17. An arrangement as defined in claim 1 wherein said floor is disposed below the upper extremities of said front and rear walls.

* * * * *